US011982523B2

(12) United States Patent
Job Hofman et al.

(10) Patent No.: US 11,982,523 B2
(45) Date of Patent: May 14, 2024

(54) LIB ANODE COATING MEASUREMENT WITH DUAL X-RAY

(71) Applicant: Honeywell International Inc., Charlotte, NC (US)

(72) Inventors: Gertjan Job Hofman, Vancouver (CA); Sebastien Tixier, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/450,762

(22) Filed: Oct. 13, 2021

(65) Prior Publication Data

US 2023/0113133 A1    Apr. 13, 2023

(51) Int. Cl.
*G01N 23/00*    (2006.01)
*G01B 15/02*    (2006.01)
*H01M 4/04*    (2006.01)

(52) U.S. Cl.
CPC .............. *G01B 15/02* (2013.01); *G01N 23/00* (2013.01); *H01M 4/0404* (2013.01)

(58) Field of Classification Search
CPC ........ G01B 15/02; G01N 23/00; G01N 23/16; G01N 2223/33; G01N 2223/61; G01N 2223/645; G01N 23/083; G01N 23/04; G01N 23/087; G01N 23/18; G01N 2223/1016; G01N 2223/3303; H01M 4/0404; Y02E 60/10

See application file for complete search history.

(56) References Cited

U.S. PATENT DOCUMENTS 3,435,220 A * 3/1969 Hanken ................ G01N 23/083
378/53
4,959,848 A * 9/1990 Parobek ................ G01B 15/02
378/50

(Continued)

FOREIGN PATENT DOCUMENTS

JP          200664580 A    3/2006
JP          2010286405 A   12/2010
(Continued)

OTHER PUBLICATIONS

Etiemble, et al., "Quality control tool of electrode coating for lithium-ion batteries based on X-ray radiography", Journal of Power Sources, vol. 298, Dec. 1, 2015, pp. 285-291 (7 pages total).

(Continued)

*Primary Examiner* — Kiho Kim
(74) *Attorney, Agent, or Firm* — John Maldjian, Esq.; Stevens & Lee PC (57) ABSTRACT

A system includes a top scanner head configured over a coated substrate. An x-ray sensor and a second x-ray sensor scan the coated substrate. At least one of the x-ray sensor and second x-ray sensor is tuned to an energy level below an absorption peak and at least one of the x-ray sensor and second x-ray sensor is tuned to an energy level above the absorption peak. The x-ray sensor and second x-ray sensor scan a same sheet spot on the coated substrate. A bottom scanner head is configured underneath the coated substrate to provide a location for a detection of x-rays for the x-ray sensor and the second x-ray sensor.

13 Claims, 5 Drawing Sheets

(56) References Cited

U.S. PATENT DOCUMENTS

| | | | |
|---|---|---|---|
| 5,778,041 | A | 7/1998 | Chase et al. |
| 8,394,449 | B2 | 3/2013 | Meijer Drees et al. |
| 10,982,956 | B2 | 4/2021 | Kurata et al. |
| 2020/0408584 | A1 | 12/2020 | Nebel et al. |

FOREIGN PATENT DOCUMENTS

| | | | |
|---|---|---|---|
| JP | 2013233716 A | * | 11/2013 |
| JP | 2021004877 A | | 1/2021 |

OTHER PUBLICATIONS

"Lithium Ion Battery (LIB) Application Report", Mahlo America Inc. (2017), Retrieved from https://www.mahlo.com/fileadmin/user_upload/PDF/Publikationen/mInfo/mInfo_lithium-ion-battery-applications.pdf, Retrieved on Jul. 27, 2021 (6 pages total).

Extended European Search Report dated Apr. 4, 2023, issued in connection with corresponding EP Application No. 22198282.0 (9 pages total).

Notice of Reasons for Rejection dated Aug. 25, 2023 issued in connection with corresponding JP Application No. 2022-163616 (4 pages total).

* cited by examiner

LIB ANODE COATING MEASUREMENT WITH DUAL X-RAY

TECHNICAL FIELD

The present disclosure generally relates to a scanning measurement system that identifies the ratio of x-ray sensors scanning a sheet spot on a coated substrate.

BACKGROUND

Lithium ion batteries are currently a growing in marketplace, especially with respect to car manufacturers. Currently, most car manufacturers are moving to hybrid or all electric vehicles. As a result, the production of anode electrodes is increasing rapidly.

Lithium ion batteries are typically made from anode films. The anode films are usually coated with a carbon layer. Further, quality control is essential for performance. Typical measurements are done using x-ray or Beta gauges.

The copper foil can make the x-ray performance difficult. The copper foil is usually highly absorptive. As a result, it is often difficult to distinguish between variations in the copper or the coating involved.

With the copper foil, current methods use scanners to measure before and after coating. Such methods are currently expensive. Such methods are also difficult due to the high absorption of the copper foil. As such, there is a need for a more cost effective method that can more effectively distinguish between the coating and foil thickness variations.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is aspect of the disclosed embodiments to provide a scanning measurement system to scan a sheet spot on a coated substrate and distinguish between coating or foil thickness variations.

The aforementioned aspects and other objectives can now be achieved as described herein.

In an embodiment, a top scanner head is configured above a coated substrate. An x-ray sensor and a second x-ray sensor are configured to scan the coated substrate. At least one of the x-ray sensor and the second x-ray sensor is tuned to an energy level below an absorption peak. The at least one of the x-ray sensor and the second x-ray sensor is tuned to an energy level above the absorption peak. The x-ray sensor and the second x-ray sensor scan a same or nearly the same sheet spot on the coated substrate. A bottom scanner head is configured underneath the coated substrate to provide a location for a detection of x-rays by the x-ray sensor and the second x-ray sensor.

The x-ray sensor is configured to move across the sheet as the sheet propagates underneath the x-ray sensor.

The second x-ray sensor is configured to move in correlation with the x-ray sensor.

The second x-ray sensor is tuned to the energy below the absorption peak.

In an embodiment, a top scanner head is configured at a first position. A plurality of x-ray sensors are configured to scan a sheet spot on a coated substrate. The plurality of x-ray sensors scan the sheet spot with at least one of the plurality of x-ray sensors tuned to an energy level below ten kiloelectron volts and at least one of the other of the plurality of x-ray sensors tuned to an energy level above ten kiloelectron volts. The plurality of x-ray sensors scan photons of energy above and below ten kiloelectron volts. A bottom scanner head receives the scanning of the plurality of x-ray sensors.

The coating substrate includes Carbon-Silicon coating.

Two energy x-ray beams are created through filtering a single x-ray source.

A processor is configured to calculate a basis weight in real-time while the plurality of x-ray sensors are operating.

In an embodiment, a method includes positioning a top scanner head above a coated substrate. The method also includes configuring an x-ray sensor and a second x-ray sensor to scan the coated substrate. At least one of the x-ray sensor and the second x-ray sensor is tuned to an energy level above an absorption peak. Further, the at least one of the x-ray sensor and the second x-ray sensor is tuned to an energy level below the absorption peak. The x-ray sensor and the second x-ray sensor scan a same sheet spot on the coated substrate. The method also includes positioning a bottom scanner head underneath the coated substrate to provide a location for a detection of x-rays by the x-ray sensor and the second x-ray sensor.

The second x-ray sensor is configured to sense photons of energy above the absorption peak.

A processor is configured to record signals from the x-ray sensor and the second sensor.

The processor is configured to determine a ratio of the signals with the coated substrate not present to the x-ray sensor and second x-ray sensor being configured over the coated substrate.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc. v. H. J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . .".

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

Introduction

Embodiments of the present invention include a system with a plurality of ways to measure the sensor signals of dual x-ray sensors that are configured to scan a same sheet spot on a coated substrate. One of the x-ray sensors will be tuned to an energy level below the copper absorption peak of ten kiloelectron volts (KeV). The other x-ray sensor will be tuned to an energy level above the copper absorption peak of 10 KeV. As such, the x-ray sensor tuned to the energy level above 10 KeV will be configured to sense photons of energy greater than the copper absorption peak. In contrast, the x-ray sensor tuned to the energy level below 10 KeV is configured to sense photons of energy below 10 KeV. The x-ray sensors will be placed in a top scanner head of a scanning measurement system.

Underneath the top scanner head, a coated substrate will be positioned. On the coated substrate will be sheet material and Carbon (and sometimes Carbon-Silicon) coating. The x-ray sensors tuned below and above the Copper absorption peaks will scan the same sheet spot on the coated substrate.

A bottom scanner head will be positioned under the coated substrate. The bottom scanner head will enable the dual x-ray sensors to scan the same sheet spot on the coated substrate. The bottom scanner head will be configured with receivers to receive the transmissions of the scans from the x-ray sensors within the top scanner head.

A computing device will also be positioned within the scanning measurement unit. The computing device will be positioned adjacent to the top scanner head, coated substrate, and the bottom scanner head. The computing device will include a memory and a processor. The processor will calculate the basis weights for the Copper and the Carbon-Silicon as the x-ray sensors are operating by scanning the sheet spot. The computing device will also find the ratio of the sensor signals Rhigh and Rlow for the x-ray sensors. Rhigh and Rlow will refer to the sensor signals based on the x-ray sensors being tuned above and below the copper absorption peaks and are the ratio of the signals obtain on sheet to those obtained off-sheet. As such, the computing device will use the Rhigh and Rlow sensor signals to calculate the basis weights for Copper and Carbon-Silicon.

An energy graph comparison of silicon in comparison to copper can be generated based on the signals of the dual x-ray sensors. The comparison of the Carbon-Silicon to Copper will illustrate how the absorption with Carbon-Silicon is steady as the energy increases in comparison to Copper, which has a sharp spike in absorption as the energy increases. As such, the basis weight for Carbon-Silicon and Copper will be calculated. The basis weights will be determined using the sensor signals Rlow and Rhigh of the dual x-ray sensors. The computing device will also determine various constants in addition to the Rlow and Rhigh in order to determine the basis weights for both Copper and Carbon-Silicon.

System Structure

Figure 1A:
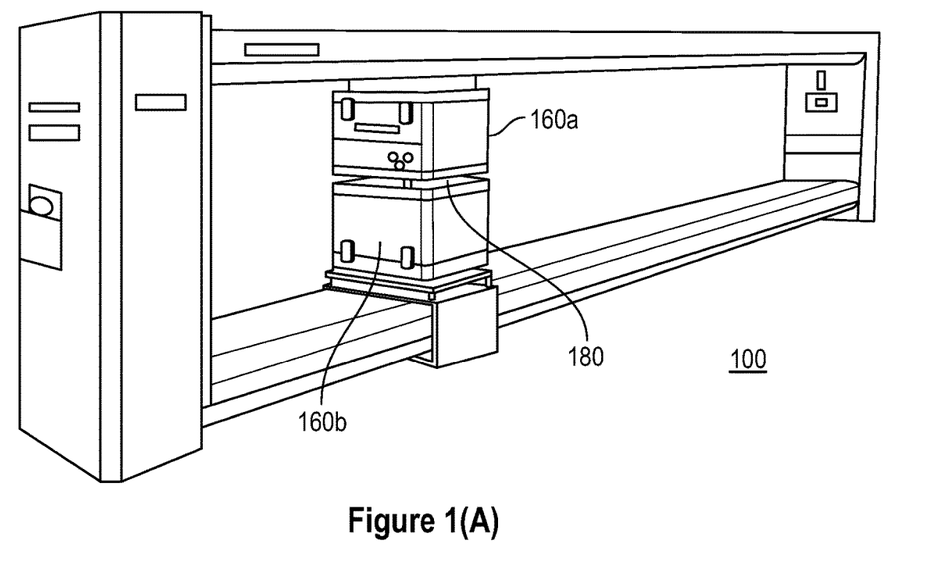
FIG. 1(A) illustrates a scanning measurement system in accordance with an embodiment of the invention.
Figure 1B:
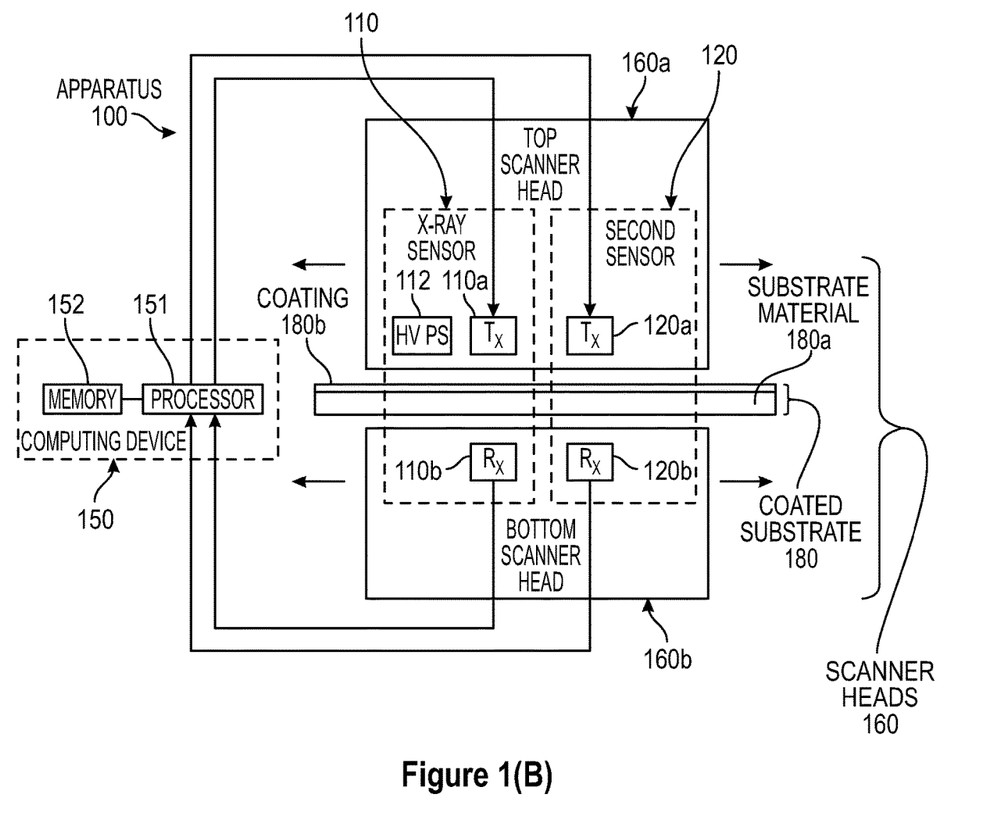
FIG. 1(B) illustrates schematic diagram of the scanning measurement system in accordance with the invention.

FIG. 1(A) illustrates a scanning measurement system 100. The scanning measurement system 100 will be used to scan a sheet spot that is configured on a coated substrate. The coated substrate will include silicon coating. Two x-ray sensors can be configured within a top head scanning head 160a of the scanning measurement system 100. The two x-ray sensors can scan the same sheet spot on a coated substrate. A bottom scanner head 160b will be configured underneath the coated substrate to receive the scanning transmissions of the two x-ray sensors configured in the top scanner head 160a. A coated substrate 180 is also illustrated. FIG. 1(B) described below illustrates the schematic diagram of the scanning measurement system 100 in more detail.

In FIG. 1(B), a schematic diagram of the scanning measurement system 100 is illustrated. The scanning measurement system 100 will include scanner heads 160. The scanner heads 160 will include a top scanner head 160a. The top scanner head 160a will include an x-ray sensor 110 and a second x-ray sensor 120. Both x-ray sensors 110, 120 will be tuned to a different energy level. In other words, one of the x-ray sensor 110 and second x-ray sensor 120 will be tuned to an energy level near a copper absorption peak near ten kiloelectron (KeV) volts. In contrast the other of the x-ray sensor 110 and second x-ray sensor 120 will be tuned to an energy level below the copper absorption peak of 10 KeV. The x-ray sensor 110 will include a high voltage power supply (HVPS) 112 that leads to a transmission 110a of a scan. The second x-ray sensor 120 will also include a transmission 120a of a scan. The sensor 110/120 that is tuned below the copper absorption peak will have a sensor signal Rlow, and will be configure to sense photons of energy below 10 KeV. The other sensor 110/120 tuned above the copper absorption peak will have a sensor signal Rhigh and be configured to sense photons of energy above 10 KeV. The x-ray sensors 110, 120 will measure the weight per square meter for the copper and the silicon.

Referring to FIG. 1(B), under the x-ray sensor 110 and second x-ray sensor 120, a coated substrate 180 will be positioned. The coated substrate 180 will include substrate material 180a and Carbon-Silicon coating 180b. Below the coated substrate 180 will be a bottom scanner head 160b that provides a location for a detection of the x-rays. The bottom scanner head 160b will include receivers 110b, 120b to receive the transmissions 110a, 120a from the x-ray sensor 110 and the second x-ray sensor 120. A computing device 150 is also configured within the scanning measurement system 100. The computing device 150 will include a memory 152 and a processor 151. The computing device 150 will use a computer algorithm to calculate various constants. The computing device 150 will use the calculated constants with the sensor signals from the x-ray sensors 110, 120. Further, the computing device 150 will also take a logarithm of the sensor signals Rlow, Rhigh. The computing device will use a mathematical equation to calculate the basis weights BWsi, BWcu. The equation is displayed below:

$$BW_{si} = A0*Ln(R_{low}) + B0*Ln(R_{high}) + C0$$

$$BW_{cu} = A1*Ln(R_{low}) + B1*Ln(R_{high}) + C1$$

In FIG. 1(B), the x-ray sensor 110 and the second x-ray sensor 120 are configured to scan the substrate material 180a that is positioned on the coated substrate 180. Preferably, both the x-ray sensor 110 and the second x-ray sensor 120 will scan the same sheet spot on the coated substrate 180. The transmissions 110a, 120b will be received by the bottom scanner head 160b. The receivers 110b, 120b will receive the transmissions 110a, 120b of the coated substrate 180 from the scans of the x-ray sensor 110 and the second x-ray sensor 120. The computing device 150 will calculate the basis weights BWsi, BWcu based on the received sensor signals.

Figure 2:
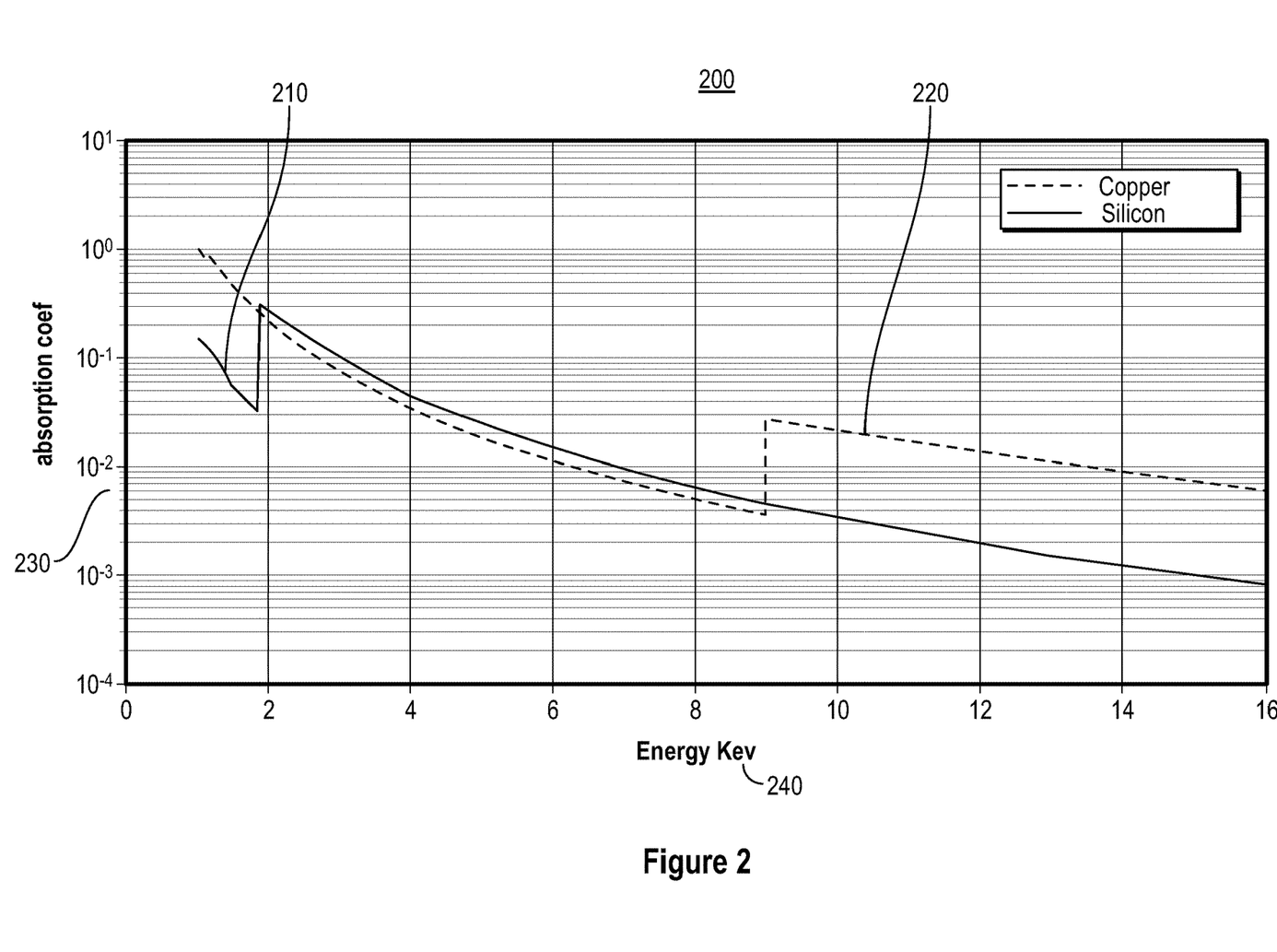
FIG. 2 illustrates an a comparison graph of x-ray absorption curves in accordance with an embodiment of the invention.

In FIG. 2, curves showing a comparison 200 with an energy curve of silicon coefficients 210 and copper coefficients 220. The comparison also illustrates the absorption coefficients 230 and the energy levels 240. As stated above in FIG. 1(B), one of the x-ray sensors is tuned to an energy level below the copper absorption peak below 10 KeV. In contrast, the other x-ray sensor is tuned to an energy level above the copper absorption peak 10 KeV. By using the x-ray sensor and the second x-ray sensor that are looking at the same sheet spot on the coated substrate, the coating or foil thickness variations can be distinguished. The coated substrate includes silicon coating. As such, both x-ray sensors can scan the same sheet spot on the coated substrate to identify the difference between the silicon and copper. In other words, both x-ray sensors can identify ratio of the energy with the coated substrate present to when the x-ray sensors are not positioned over the coated substrate. The x-ray sensors will be configured to move from left to right and back, while the sheet will move down the production line. As a result, a zig-zag measurement pattern is created.

In FIG. 2, a clear difference between the silicon coefficients 210 and the copper coefficients 220 curve is illustrated. The energy curve for the silicon coefficients 210 shows a more steady absorption as the energy level increases. Moreover, there is no sharp decline or increase shown for the silicon coefficients 210. In contrast, the curve for the copper coefficients 220 shows a sharp spike in absorption as the energy level increases, As such, the comparison of the silicon coefficients 210 curve and the copper coefficients 220 curve illustrate the difference between the present of the coating material and the absence of the coating material. The silicon coefficients 210 curve illustrate the steady decline in absorption as the energy level increases with the sheet material being present. In contrast, the copper coefficients 220 curve illustrates a spike in absorption as the energy level increases. Accordingly, the two x-ray sensors within the scanning measurement unit are able to determine the differences in absorption based on the coated substrate being present, and the coated substrate not being present, or the differences between coating or foil thickness variations.

Figure 3:
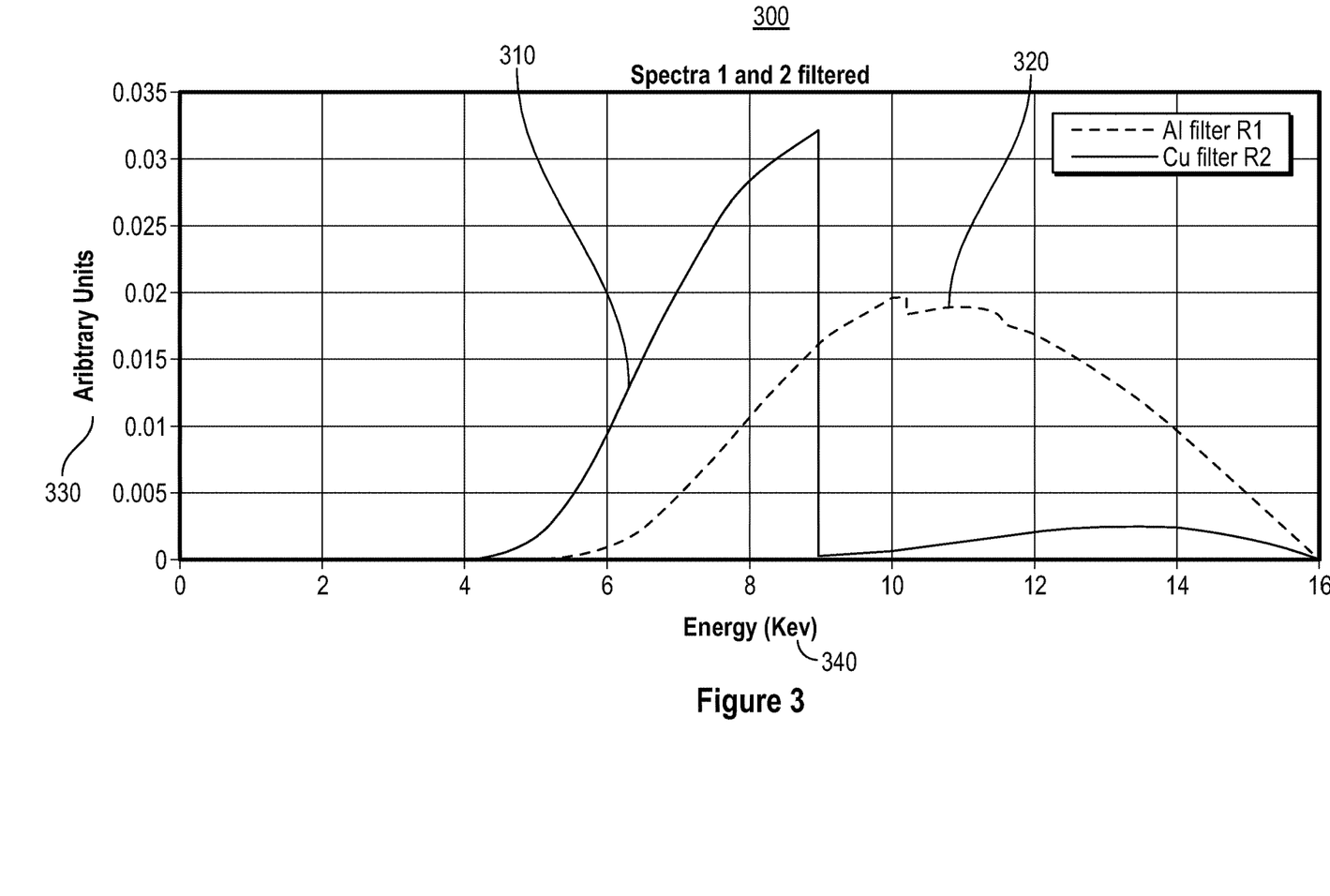
FIG. 3 energy intensity curves of two energy x-ray beams created through filtering of a single x-ray source according to an embodiment of the invention.

Referring to FIG. 3, a comparison graph 300 is illustrated, In another embodiment of the invention, two x-ray sources may be replaced by a single source whose beam is filtered using two materials, resulting in a low and high energy beam. Moreover, the energy curves for a copper filter 310 and an aluminum filter 320 are illustrated. The arbitrary units 330 and the energy (KeV) 340 are also shown.

With respect to FIG. 3, the x-ray sensors in FIGS. 1(A) and 1(B) can be configured to scan based on a second embodiment. In the second embodiment, there can be a single source with a copper filter 310 and the aluminum filter 320.

Figure 4:
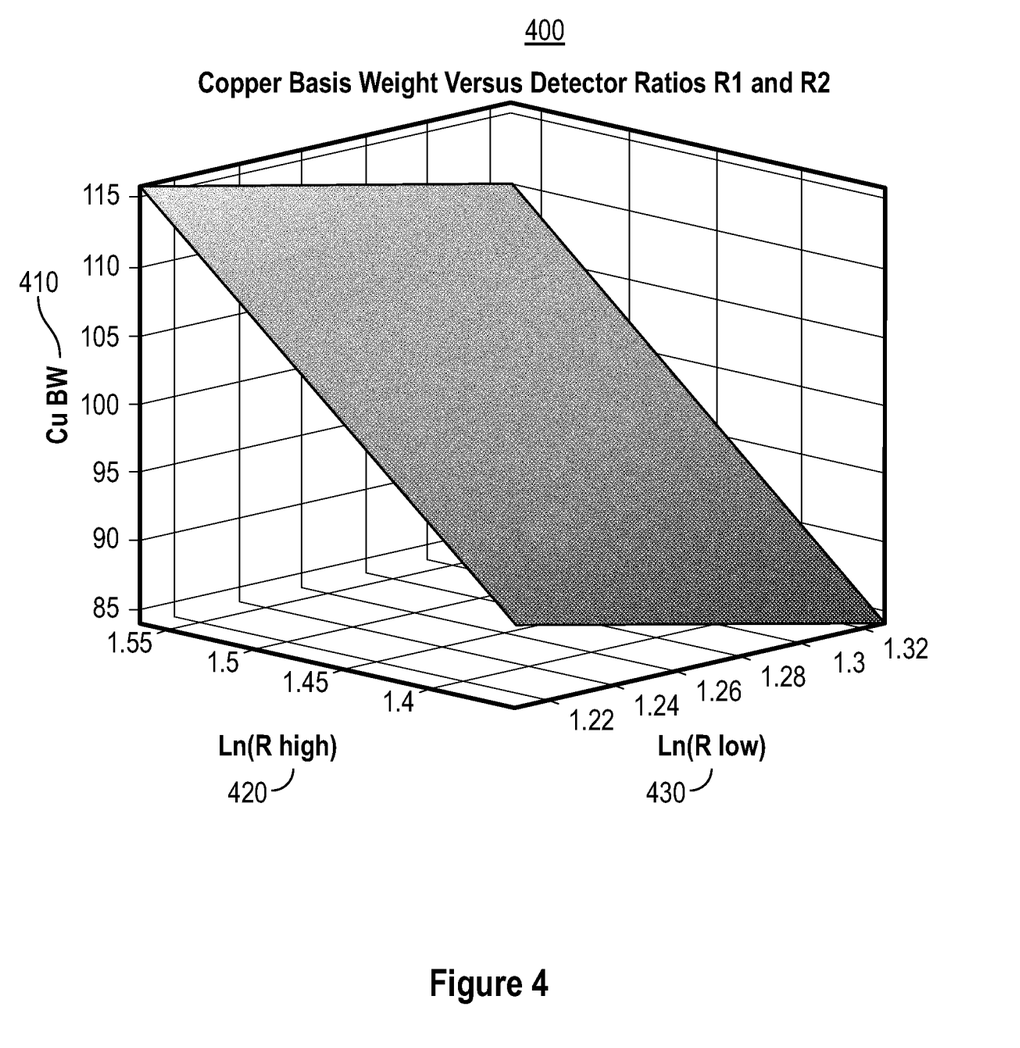
FIG. 4 illustrates a relationship between the base sheet weight and the two sensor signals (Rlow, Rhigh)

Referring to FIG. 4, a logarithmic graph that illustrates Copper Basis Weight versus Detector Ratios Rlow and Rhigh 400. The substrate weight CuBW 410 and the Logarithm Ln(Rhigh) 420 and Ln(Rhigh) 430 for both x-ray sensors are illustrated. When the two x-ray sensors described in FIG. 1(B) scan the coated substrate with one x-ray sensor tuned above the copper absorption peak (10 Kev) and one tuned below the copper absorption peak (10 KeV), various calculations are made. A computing device is configured within the scanning measurement system. The computing device will include a memory and a processor. The processor will make various calculations as the x-ray sensors are scanning the same sheet spot on the coated substrate.

In FIG. 4, the x-ray sensors will measure weight per square meter for Copper and Carbon-Silicon. In other words, the weight per square meter for the coating and the substrate will be calculated. The weight per square meter is referred to as a basis weight BW and typically measured as grams/square meter or GSM. In the logarithmic graph 400, the CuBW 410 is shown. Each of the two x-ray sensors will scan the same sheet spot on the coated substrate. The two x-ray sensors will move from left to right and back while the sheet will move down the production line. The result is a zig-zag measurement pattern. As such, the sensor signals from the x-ray sensors are recorded. The ratio of signal with the coated substrate present under the x-ray sensors to the coated substrate not being present under the x-ray sensors is calculated. A processor within the computing device can also calculate the ratio of the coated substrate present to the coated substrate not being present based on the sensor signals from the x-ray sensors.

Referring to FIG. 4, the scanning measurement system (shown in FIGS. 1(A) and 1(A)) is calibrated. Values for the sensor signals Rlow and Rhigh are recorded. As mentioned before, one of the sensors is tuned to an energy level below the Copper absorption peak, while the other sensor is tuned to an energy level above the Copper absorption peak. Rhigh refers to the x-ray sensor tuned above the Copper absorption peak while Rlow refers to the x-ray sensor tuned below the Copper absorption peak. The values for Rlow and Rhigh are used to determine the basis weight for silicon and copper CuBW 410. The equations are illustrated below:

$$BW_{si} = A0*Ln(R_{low}) + B0*Ln(R_{high}) + C0 \quad (1)$$

$$BW_{cu} = A1*Ln(R_{low}) + B1*Ln(R_{high}) + C1$$

Still referring to FIG. 4, the processor using a computer algorithm determines the constants A0, B0, C0, A1, B2, and C1. The processor within the computing device then calculates the basis weight (BW) in real time for Copper and Carbon/Silicon as both x-ray sensors are operating and scanning the sheet material on the coated substrate. A relationship can be determined between the two sensors and the sensor signals Rlow and Rhigh along with the substrate and coating weights. As shown in the Detector Ratios Rlow and Rhigh 400, the basis weight for Copper (CuBw) 410 is shown, and a relationship between the two sensors are illustrated by Ln(Rhigh) 420 and Ln(Rlow) 430. The substrate weight CuBW 410 is mathematically related to the output of both x-ray sensors. In other words, the substrate weight CuBW 410 is mathematically related to the Logarithm Ln(R) of each of the x-ray sensor signals Rlow and Rhigh. As such, the logarithmic graph 400 illustrates a three-dimensional plot depending on sensor signals from the two x-ray sensors that scan the sheet material on the coated substrate.

Figure 5:
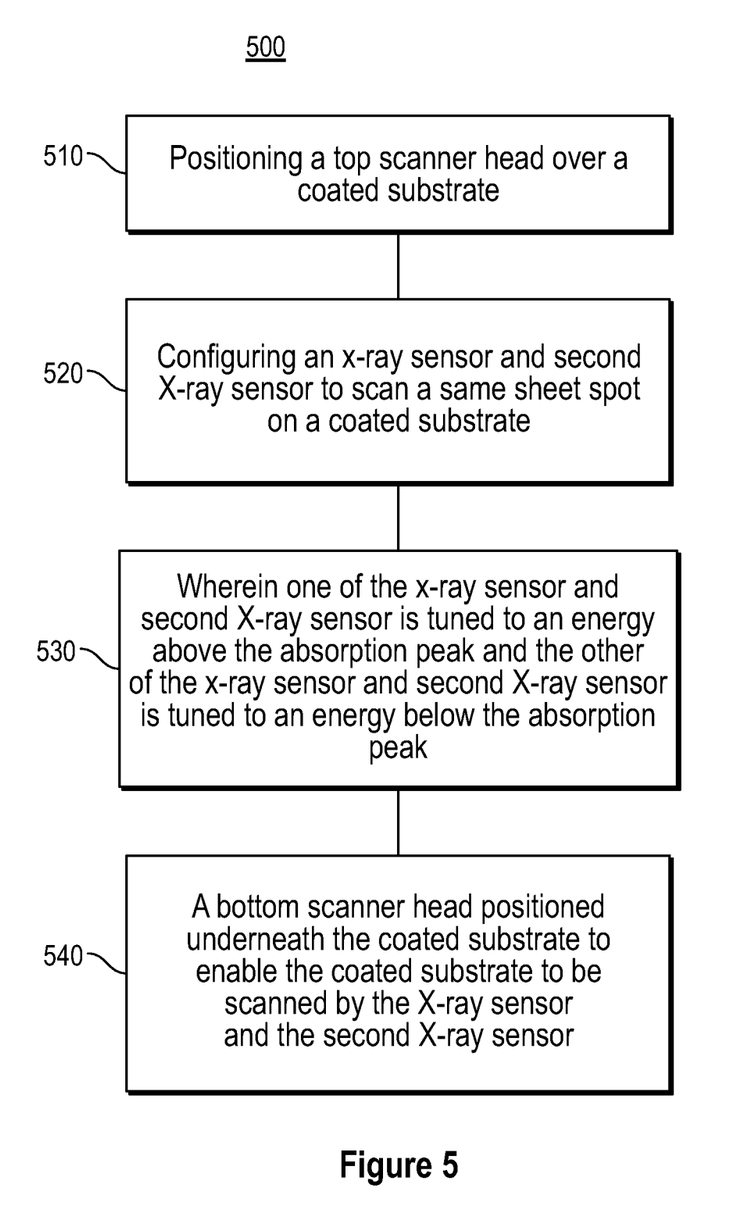
FIG. 5 depicts a flow chart in accordance with an embodiment of the invention

In FIG. 5, a process 500 for the scanning measurement unit is shown. The scanning measurement unit will have a top scanner head, a computing device, and a bottom scanner head. The scanning measurement unit will have two x-ray sensors within the top scanning head. Moreover, one of the x-ray sensors is tuned below the copper absorption peak of 10 KeV, while the other x-ray sensor is tuned below the copper absorption peak of 10 KeV.

In FIG. 5, at step 510, in the scanning measurement system, a top scanner head is configured above a coated substrate. The top scanner head will include a first x-ray sensor and a second x-ray sensor. Both the first and second x-ray sensor will be configured to scan the same sheet spot on the coated substrate. The top of the coated substrate will include silicon coating or a silicon filter. As mentioned above, either the first or second x-ray sensor will be tuned below the copper absorption peak of 10 KeV, while the other will be tuned above the copper absorption peak of 10 KeV.

Referring to FIG. 5, at step 520, the first and second x-ray sensor will scan a sheet spot on the coated substrate. In particular, the x-ray sensors will scan the same sheet spot on the coated substrate. As the x-ray sensors are scanning the same sheet spot, the computing device configured within the scanning measurement system will calculate the basis weight for the silicon and for copper. The computing device will calculate the basis weights for Copper and Silicon in real-time while the x-ray sensors are operating. The computing device will use determined constants along with the logarithmic values for the sensor signals to calculate the basis weights for Copper and Silicon.

In FIG. 5, at step 530, as mentioned above, one of the x-ray sensors is tuned to an energy level below the Copper absorption peak of 10 KeV. In contrast, the other x-ray sensor is tuned to an energy level above the Copper absorption peak of 10 KeV. In practice, either one of the x-ray sensors can be tuned to an energy level below the Copper absorption peak while the other x-ray sensor is tuned to an energy level above the Copper absorption peak. As such, both x-ray sensors scan or signals based on the sheet spot on the coated substrate will be noted as Rlow for the x-ray sensor tuned below the Copper absorption peak, and Rhigh for the x-ray sensor tuned above the Copper absorption peak. The computing device will use the logarithmic values for the sensor signals to determine the basis weights for Copper and Silicon.

In FIG. 5, at step 540, a bottom scanner head is positioned below the coated substrate and the sheet material. The bottom scanner head enables the coated substrate to be scanned by the x-ray sensors. The bottom scanner head is also configured to receive the transmissions from the x-ray sensors that scan the sheet spot on the coated substrate. The bottom scanner head is configured with receivers to receive the transmissions from the x-ray sensors in the top scanner head.

Those skilled in the art will appreciate that the example embodiments are non-exhaustive and that embodiments other than that described here may be included without departing from the scope and spirit of the presently disclosed embodiments.

Advantages

Overall, the scanning measurement system can have a single x-ray source with x-ray filters to create two spatially separated energy beams that go into energy insensitive directions, In another embodiment, a single x-ray source with x-ray filters can create two spatially separated energy separate beams that go into energy sensitive detectors to enhance low/high discrimination.

In addition, there can be a single x-ray source with two stacked detectors. The top detector would sense low energy x-rays while the bottom detector would sense higher energy x-rays. There can also be dual x-ray sources that are set to different accelerating voltages with the possible addition of x-ray filters that are placed above two separate energy insensitive detectors. Further, a single x-ray source can go into an energy-sensitive detector such that the detector would create a different output signal for a low and a high energy detector.

The advantages of the scanning measurement system include two x-ray sensors that are tuned to different energies that are above and below the Copper absorption peak of 10 KeV respectively. The sensor signals from the scans of the x-ray sensors are used to identify the basis weight for the copper and the silicon. Each of the two sensor signals is recorded as a ratio of the signal with the sheet material present in the coated substrate to the x-ray sensors not being configured over the coated substrate. As mentioned above, the measurement without the coating substrate present is recorded by moving the measuring heads or x-ray sensors off of the coating substrate. As such, a ratio of the signal with the coating substrate present to the coating substrate not being present is calculated using the sensor signals from the x-ray sensors.

As mentioned above, the scanning measurement system enables the basis weight for the copper and the silicon to be identified. The computing device configured within the scanning measurement unit calculates the basis weights for Copper and Carbon/Silicon in real-time while the x-ray sensors are scanning the sheet material. The sensor signals form both sensors along with various constants are used by the computing device to calculate the basis weights for Copper and Carbon/Silicon using the logarithmic values for the sensor signals described above. As such, the scanning measurement system has the ability to identify the differences in absorption (as shown in FIG. 2) with the coating substrate being present and the coating substrate not being present and the differences between coating or foil thickness variations.

Conclusion

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A system comprising:
    a computing device including a processor;
    a top scanner head configured above a coated substrate including a copper and a carbon-silicon coating;
    an x-ray sensor and a second x-ray sensor configured to scan the coated substrate, wherein at least one of the x-ray sensor and the second x-ray sensor is tuned to an energy below an absorption peak and the at least one of the x-ray sensor and the second x-ray sensor is tuned to an energy level above the absorption peak, and wherein the x-ray sensor and the second x-ray sensor scan a same sheet spot on the coated substrate;
    the processor within the computing device configured to calculate a basis weight for silicon and for copper in real-time based on the scanning of the sheet spot on the coated substrate while the x-ray sensors are operating; and a bottom scanner head configured underneath the coated substrate to provide a location for a detection of x-rays for the x-ray sensor and the second x-ray sensor.

2. The system of claim 1, wherein the x-ray sensor is configured to move in a cross-direction to a manufacturing direction of the sheet spot.

3. The system of claim 1, wherein the second x-ray sensor is configured to move in correlation with the x-ray sensor.

4. The system of claim 1, wherein the x-ray sensor is tuned to the energy above the absorption peak.

5. The system of claim 1, wherein the second x-ray sensor is tuned to the energy below the absorption peak.

6. The system of claim 1, wherein the absorption peak is 10 kiloelectron volts.

7. The system of claim 1, the second x-ray sensor is configured to sense photons of energy above 10 kiloelectron volts.

8. A system comprising:
a top scanner head configured at a first position;
a computing device including a processor;
a plurality of x-ray sensors configured to scan a sheet spot on a coated substrate including a copper and a carbon-silicon coating, wherein the plurality of x-ray sensors scan the sheet spot with at least one of the plurality of x-ray sensors tuned to an energy level below ten kiloelectron volts and at least one of the other of the plurality of x-ray sensors tuned to an energy level above ten kiloelectron volts, wherein the plurality of x-ray sensors scan photons of energy above and below ten kiloelectron volts;

the processor within the computing device configured to calculate a basis weight for silicon and for copper in real-time based on the scanning of the sheet soot on the coated substrate while the x-ray sensors are operating; and a bottom scanner that receives the scanning of the plurality of x-ray sensors at a second position.

9. The system of claim 8, wherein the coating substrate includes Carbon-Silicon coating.

10. The system of claim 8, wherein the plurality of x-ray sensors are replaced by a single x-ray source that is configured with multiple detectors.

11. The system of claim 10, wherein two energy x-ray beams are created through filtering the single x-ray source.

12. The system of claim 8, wherein the plurality of x-ray sensors are configured to measure weight per square meter.

13. The system method of claim 1, wherein the processor is configured to determine a ratio of the signals with the coated substrate not present to the x-ray sensor and the second x-ray sensor being configured over the coated substrate.

* * * * *